United States Patent
Harmuth et al.

(10) Patent No.: US 9,334,190 B2
(45) Date of Patent: May 10, 2016

(54) REFRACTORY CERAMIC BATCH AND BRICK FORMED THEREFROM

(71) Applicant: REFRACTORY INTELLECTUAL PROPERTY GMBH & CO. KG, Vienna (AT)

(72) Inventors: Harald Harmuth, Leoben (AT); Sabine Gschiel, Leoben (AT)

(73) Assignee: REFRACTORY INTELLECTUAL PROPERTY GMBH & Co KG, Vienna (AT)

( * ) Notice: Subject to any disclaimer, the term of this patent is extended or adjusted under 35 U.S.C. 154(b) by 0 days.

(21) Appl. No.: 14/398,189

(22) PCT Filed: May 7, 2013

(86) PCT No.: PCT/EP2013/059491
§ 371 (c)(1),
(2) Date: Oct. 31, 2014

(87) PCT Pub. No.: WO2013/185983
PCT Pub. Date: Dec. 19, 2013

(65) Prior Publication Data
US 2015/0087496 A1 Mar. 26, 2015

(30) Foreign Application Priority Data
Jun. 15, 2012 (EP) .................... 12172161

(51) Int. Cl.
*C04B 35/043* (2006.01)
*C04B 35/04* (2006.01)
*C04B 35/626* (2006.01)

(52) U.S. Cl.
CPC ............... *C04B 35/04* (2013.01); *C04B 35/043* (2013.01); *C04B 35/0435* (2013.01); *C04B 35/6264* (2013.01); *C04B 2235/3206* (2013.01); *C04B 2235/3208* (2013.01); *C04B 2235/3217* (2013.01); *C04B 2235/3272* (2013.01); *C04B 2235/3418* (2013.01); *C04B 2235/3826* (2013.01); *C04B 2235/3873* (2013.01); *C04B 2235/3895* (2013.01); *C04B 2235/5427* (2013.01); *C04B 2235/5436* (2013.01); *C04B 2235/5463* (2013.01); *C04B 2235/72* (2013.01); *C04B 2235/96* (2013.01)

(58) Field of Classification Search
CPC ...... C04B 35/43; C04B 35/435; C04B 35/56; C04B 35/5603; C04B 35/565; C04B 35/584; C04B 35/043; C04B 35/0435
See application file for complete search history.

(56) References Cited

U.S. PATENT DOCUMENTS

| | | | |
|---|---|---|---|
| 4,540,674 | A | 9/1985 | Watanabe et al. |
| 5,130,277 | A | 7/1992 | Ueda et al. |
| 5,700,309 | A | 12/1997 | Zivkovic et al. |
| 5,723,394 | A | 3/1998 | Harmuth et al. |
| 6,482,760 | B1 | 11/2002 | Buchebner et al. |

FOREIGN PATENT DOCUMENTS

| | | |
|---|---|---|
| CN | 1654426 A | 8/2005 |
| DE | 3329250 A1 | 8/1984 |
| DE | 4442282 A1 | 6/1995 |
| DE | 4403869 A1 | 8/1998 |
| DE | 19859372 C1 | 6/2000 |
| EP | 0370176 A2 | 5/1990 |
| JP | H02164779 A | 6/1990 |
| JP | H02274370 A | 11/1990 |
| KR | 20100101425 A | 9/2010 |
| WO | 8400158 A1 | 1/1984 |

OTHER PUBLICATIONS

Machine translation of KR20100101425, Sep. 2010.*
Machine translation of CN 1654426, Aug. 2005.*
International Search Report for App. No. PCT/EP2013/059491 filed May 7, 2013.

* cited by examiner

*Primary Examiner* — Karl Group
(74) *Attorney, Agent, or Firm* — Walker & Jocke

(57) ABSTRACT

A refractory ceramic batch with the composition of 75 to 98% by weight of at least one basic base material from the group having sintered magnesia and fused magnesia, 2 to 25% by weight. of at least one granular aggregate from the group having silicon carbide, silicon nitride, silicon oxycarbide, silicon oxycarbonitride, and a maximum 5% by weight of other constituents.

38 Claims, No Drawings

US 9,334,190 B2

REFRACTORY CERAMIC BATCH AND BRICK FORMED THEREFROM

The invention relates to a refractory ceramic batch and also to a refractory ceramic brick formed therefrom.

Refractory ceramic products fall into different categories, for example basic and non-basic products. The invention relates only to basic products, namely a batch and a brick of which the basic base material consists of sintered magnesia and/or fused magnesia.

Generic batches and bricks are known from DE 44 03 869 C2 and DE 198 59 372 C1. Apart from the basic base material, known products comprise spinels (hercynite, galaxite, jacobsite).

It was found here that by combining the basic base material with the aforementioned spinels, advantageous mechanical properties of the fired product can be achieved. In particular, the ductility (brittleness) of the fired formed body is improved (reduced); in some cases resistance, particularly to attack by alkalines, is improved.

It is mentioned that the reaction and sintering mechanisms during the firing of the corresponding parts is not yet completely understood, although various findings suggest that complete, dense sintering between the individual batch components does not take place, which means that the fired part also exhibits a degree of "elasticity" (flexibility). In other words, although the batch components are involved in a physical-chemical interaction during firing, the product is nevertheless less brittle than the individual batch components and is "more elastic" overall.

Although the aforementioned refractory products have performed successfully in industry for many years and are used to line rotary cement furnaces, for example, there is a need for further improvements, particularly with regard to the thermal resistance of the fired products. For example, the invariant point in the dicalcium silicate calcium aluminate spinel periclase system is only approx. 1325° C.

The object of the invention is to provide a basic refractory ceramic batch from which refractory formed parts can be produced which offer high refractoriness in addition to an advantageous structural elasticity, the refractoriness being determined by an invariant point of over 1400° C. The fired product should preferably also exhibit particularly good corrosion resistance.

The invention departs from the path indicated in the state of the art of using spinels combined with a periclase base material. It has been found that the $Al_2O_3$ content of the spinels is crucial to reducing the thermal resistance of the fired products. This particularly applies when combined with the batch component CaO. Although the CaO content of the total batch can be reduced using calcium-deficient base materials, the problem remains when calcium oxide is recycled during use. This is the case in rotary furnaces used in the production of cement clinker, for example.

Extensive tests revealed that these disadvantages can be eliminated by a completely different batch component, namely a batch component from the group comprising silicon carbide, silicon oxycarbide, silicon oxycarbonitride, silicon nitride.

If, following the addition of a conventional binding agent such as lignosulfonate (for example in a quantity of up to 4% by wt. relative to the total batch), a brick is pressed and fired (particularly in a temperature range from 1400° C. to 1600° C.), in a product according to the invention there are only partial sinter bridges between the basic (MgO) base material and the granular aggregate, wherein the following mineral phases in particular are formed: $MgSiO_3$, $Mg_2SiO_4$, $SiO_2$. In this case, $SiO_2$ is produced through the oxidation of SiC during an (oxidizing) pyroprocess. In most cases, $SiO_2$ reacts with MgO and forms enstatite. Adjacent thereof this, forsterite is formed which creates a direct bond with the basic base material, as enstatite is not stable alongside MgO.

It has been possible to observe in tests that no more than half the surface of the granular aggregate is sintered with the surrounding basic refractory base material. In many cases, the granular aggregate even lies loosely in the basic matrix after firing, in other words there are absolutely no fixed connections between individual aggregate particles and the basic matrix material. Apart from MgO, forsterite can also occur in the direct environment of the aggregate particles. The extent of the sintering of the granular aggregate with the surrounding basic refractory base material could be identified by means of a microscopic investigation of a polished section; this revealed that the grain periphery is sintered with the surrounding basic base material over no more than half its length.

To this extent, the structure of a refractory ceramic product according to the invention differs from a structure of a brick according to the state of the art which contains spinel. Using the new product, the characteristic ductility values at least are achieved which are exhibited by the known spinel products.

In relation to this state of the art, the product according to the invention is characterized by a significantly higher invariant point which is routinely at least 100° C., often more than 200° C., above that of products with hercynite and/or galaxite and/or jacobsite. The refractoriness is correspondingly high.

In the most general embodiment, the invention comprises a refractory ceramic batch with the following composition:
75 to 98% by wt. of at least one basic base material from the group: sintered magnesia, fused magnesia,
2 to 25% by wt. of at least one granular aggregate from the group: silicon carbide, silicon nitride, silicon oxycarbide, silicon oxycarbonitride,
maximum 5% by wt. of other constituents,
wherein the weight data each relate to the total batch.

The aforementioned properties can be optimized by the following variations which can be realized individually and in combination with one another, insofar as this is not expressly precluded:
use of the basic base material in a proportion >10 and <40% by wt. (relative to the total batch) in a fine fraction <125 μm,
use of a basic base material in a proportion >35% by wt. (relative to the total batch) in a grain fraction >1 mm,
use of the granular aggregate in a grain range >125 μm and <3 mm, wherein the lower limit may also be >0.5 mm and the upper limit may also be <2 mm,
reduction in the proportion of granular aggregate in the total batch to a quantity of 2 to 10% by wt.,
selection of a basic base material that itself comprises at least 95% by wt. MgO, wherein this proportion is preferably even higher, for example over 97% by wt. or over 98.5% by wt.,
coordination of the grain sizes of the aggregate and of the basic base material, such that the $d_{90}$ value of the basic granular base material (in other words the basic base material without the fine fraction <125 μm) lies above the $d_{90}$ value of the granular aggregate,
use of a basic base material with an iron content, measured as $Fe_2O_3$, of less than 0.6% by wt. relative to the basic base material, wherein this proportion should be as small as possible, for example <0.3% by wt., selection of the basic base component, such that it contains no or only a small amount (<0.3% by wt. in each case) of chromium oxide and/or aluminium oxide relative to the total batch, the aggregate material should also be as pure as possible, in order to achieve the desired effects optimally, wherein extraneous constituents of the aggregate particularly of <5% by wt. relative to the percentage by weight of the aggregate in the total batch are favourable.

The batch according to the invention therefore comprises in particular two batch components (basic base material, granular aggregate) in different grain fractions, wherein it has proved particularly favourable for the basic base material to have a proportion of fine fraction (<125 µm), while the granular aggregate should be present quite predominantly (preferably at least 90%) in a grain fraction outside (above, therefore in a coarser granulation) this fine range.

Apart from small proportions of impurities which are mainly caused by the raw materials used, the product according to the invention contains (apart from the carbide and/or nitride in the aggregate) only the oxides CaO, MgO and $SiO_2$. The $CaO/SiO_2$ ratio for the basic component used is correspondingly high and is preferably at least 2, in particular >3, >4 or >5. An invariant point significantly greater than 1700° C. can thereby be achieved.

The carbide or nitride bond of the silicon is also responsible for the high $CaO/SiO_2$ ratio. This also has advantages in relation to the corrosive load on the fired product.

When using a silicon carbide, with an oxidizing pyroprocess there can be a partial oxidation of the silicon carbide, which leads to a lower $CaO/SiO_2$ ratio. In this way, increased sintering would be caused, which is undesirable in principle, because it would increase the brittleness.

To this extent, the batch according to the invention enables, however, a certain ductility of the fired product to be set by adjusting the furnace atmosphere during firing.

Finally, the invention enables the fired products to be impregnated with carbon, for example pitch. This is not possible with products according to the state of the art (with spinel additions in the form of hercynite, jacobsite or galaxite), because the spinels contain iron or manganese oxides which would be reduced by the impregnating material at the application temperatures. This would cause the impregnating material to oxidize and therefore become at least partially ineffective. By contrast, the product according to the invention is compatible with carbon impregnation of this kind, particularly since it already contains a carbide substance (the granular aggregate) in substantial embodiments.

In order to produce the ceramic formed part according to the invention, a binding agent is added to the batch. The binding agent can be added to the batch, for example in proportions in the range of 1 to 4% by weight, in particular also in proportions in the range of 2 to 3% by wt., each relative to 100% by wt. of the total batch (the proportions of binding agent are therefore added to 100% by wt. of the aggregate).

The refractory ceramic formed part according to the invention in its most general embodiment is characterized by the following features, each determined at room temperature:
produced from a batch of the aforementioned kind,
subsequent pressing into a formed part,
subsequent firing at temperatures of between 1400° C. and 1600° C.,
wherein no more than half the granular aggregate is sintered with the surrounding basic base material.
The brick may have the following property features:
modulus of elasticity: <60 GPa
work of fracture: >200 Nm
nominal notched-bar tensile strength: <9 MPa
characteristic length: >250 mm
invariant point: >1700° C.

The modulus of elasticity (E-modulus) may in particular be determined according to the data in the following literature reference: G Robben, B Bollen, A Brebels, J van Humbeeck, O van der Biest: "Impulse excitation apparatus to measure resonant frequencies, elastic module and internal friction at room and high temperature", Review of Scientific Instruments, Vol. 68, pp 4511-4515 (1997).

The work of fracture, the nominal notched-bar tensile strength and also the characteristic length may, in particular, be determined according to the data in the following literature reference: Harmuth H, Manhart Ch, Auer Th, Gruber D: "Fracture Mechanical Characterisation of Refractories and Application for Assessment and Simulation of the Thermal Shock Behaviour", CFI Ceramic Forum International, Vol. 84, No. 9, pp E80-E86 (2007).

The invariant point may in particular be determined from the phase system of the mineral phases present in the brick.

The bricks may preferably be used in industrial furnaces such as rotary furnaces for cement clinker production, but also in the steel industry.

Further features of the invention result from the features of the dependent claims and also the other application documents.

The invention is explained in greater detail below with the help of various exemplary embodiments.

Four different refractory ceramic batches are specified in the following Table 1, wherein batches S-1, S-2 and S-3 indicate exemplary embodiments of batches according to the invention and batch S-0 indicates the composition of a comparative batch not according to the invention. All data in this case on the proportions of the batches accounted for by the respective components in % by weight (% by wt.) relate to 100% by wt. of the respective total batch.

TABLE 1

| | Batch component | | | |
|---|---|---|---|---|
| | S-0 | S-1 | S-2 | S-3 |
| Sintered magnesia (grain fraction 3 to 5 mm) | 15.0 | 15.0 | 15.0 | 15.0 |
| Sintered magnesia (grain fraction 1 to <3 mm) | 40.0 | 37.0 | 36.0 | 34.0 |
| Sintered magnesia (grain fraction 0.125 to <1 mm) | 15.7 | 13.9 | 13.1 | 12.2 |
| Sintered magnesia (fine fraction <125 µm) | 29.3 | 29.1 | 28.9 | 28.8 |
| Silicon carbide (grain fraction 0.5 to 1.7 mm) | 0 | 5 | 7 | 10 |

The production process for producing a brick according to the invention with the batch components according to Table 1 was as follows in each case:
mixing of the batch components with the binding agent, namely 2.5% by wt. liquid lignosulfonate relative to the 100% by wt. of the total batch,
pressing of standard bricks (230×85×114 mm) using a pressing pressure of 140 MPa,
firing of the bricks at 1400° C. in air for 8 hours.

The data and property features of the bricks produced from the batches according to Table 1 are reproduced in Table 2. In this, the bricks made from the batches are each indicated using the designations (S-0, S-1, S-2, S-3) of the corresponding batches.

In addition, the data and property features of four further refractory bricks based on a basic base material are represented in Table 2 for comparison purposes, which bricks are not created using a batch according to the invention in each case. Specifically, the bricks A-D are the following types of bricks:
A: Fired magnesia brick based on sintered magnesia with 94% by wt. MgO and 6% by wt. $Fe_2O_3$.
B: Fired magnesia brick based on sintered magnesia with 97% by wt. MgO, 2% by wt. $SiO_2$, 0.6% by wt. CaO and 0.4% by wt. $Al_2O_3+Fe_2O_3+MnO$.
C: Fired magnesia spinel brick based on sintered magnesia with 89.5% by wt. MgO and 10.5% by wt. $Al_2O_3$.
D: Fired magnesia hercynite brick based on sintered magnesia with 91.8% by wt. MgO, 3.4% by wt. $Al_2O_3$, 3.8% by wt. $Fe_2O_3$, 0.7% by wt. CaO and 0.3% by wt. $SiO_2$.

TABLE 2

| Property | S-0 | S-1*[1] | S-1*[2] | S-2 | S-3 | A | B | C | D |
|---|---|---|---|---|---|---|---|---|---|
| Modulus of elasticity E [GPa] | 74.8 | 22.5 | 57.2 | 14.5 | 24.5 | 105 | 110 | 33.8 | 33.7 |
| Work of fracture $G_f$ [N·m$^{-1}$] | 188.8 | 247.0 | 268.6 | 205.0 | 266.6 | 106 | 129 | 117 | 143 |
| Nominal notched-bar tensile strength $\sigma_{NT}$ [MPa] | 9.2 | 4.3 | 8.0 | 2.4 | 3.6 | 11.8 | 9.97 | 3.91 | 3.41 |
| Characteristic length ($G_f * E/\sigma_{NT}^2$) [mm] | 166.1 | 298.2 | 239.7 | 508.1 | 492.4 | 80.2 | 143 | 258 | 415 |

*[1]Firing at 1400° C.;
*[2]Firing at 1500° C.

The sintered magnesia used in the bricks S-0, S-1, S-2 and S-3 had an MgO content of >97% by wt. The silicon carbide used had a purity level of approx. 95% by wt.

The property values indicated in the table were determined according to the following methods:

Modulus of elasticity: According to the data in the aforementioned literature reference in "Review of Scientific Instruments" (1997). In the exemplary embodiment the modulus of elasticity in this case was determined with the help of an RFDA (Resonant Frequency and Damping Analyser) made by IMCE n.v., Slingerweg 52, B-3600 Genk.

Work of fracture, Nominal notched-bar tensile strength and Characteristic length: Determined using the implementation and evaluation of a wedge splitting test according to the aforementioned literature reference in "CFI Ceramic Forum International" (2007).

The invention claimed is:

1. A refractory ceramic batch with the composition
   a) 75 to 98% by wt. of at least one basic base material from the group: sintered magnesia, fused magnesia,
   b) 2 to 25% by wt. of at least one granular aggregate from the group: silicon carbide, silicon nitride, silicon oxycarbide, silicon oxycarbonitride,
   c) maximum 5% by wt. of other constituents,
   relative to the total batch in each case,
   d) wherein the basic base material is present in a proportion >10 to <40% by wt. in a fine fraction <125 μm, relative to the total batch.

2. The refractory ceramic batch according to claim 1, the basic base material whereof is present in a proportion of >35% by wt. in a grain fraction >1 mm, relative to the total batch.

3. The refractory ceramic batch according to claim 1, the granular aggregate whereof is present in a grain fraction >125 μm and <3 mm.

4. The refractory ceramic batch according to claim 1, the granular aggregate whereof is present in a grain fraction >0.5 mm and <2 mm.

5. The refractory ceramic batch according to claim 1, the granular aggregate whereof is present in a quantity of 2-10% by wt. relative to the total batch.

6. The refractory ceramic batch according to claim 1, the basic base material whereof comprises at least 95% by wt. MgO.

7. The refractory ceramic batch according to claim 1, in which the $d_{90}$ value of the basic granular base material without the fine fraction lies above the $d_{90}$ value of the granular aggregate.

8. The refractory ceramic batch according to claim 1, the basic base material whereof has an iron content, measured as $Fe_2O_3$, of less than 0.6% by wt. relative to the basic base material.

9. The refractory ceramic batch according to claim 1, which contains less than 0.3% by wt. aluminium oxide relative to the total batch.

10. The refractory ceramic batch according to claim 1, which contains less than 0.3% by wt. chromium oxide relative to the total batch.

11. The refractory ceramic batch according to claim 1, the granular aggregate whereof contains maximum 5% by wt. of other constituents relative to the percentage by weight of the aggregate in the total batch.

12. A refractory ceramic brick produced from a batch according to claim 1 after pressing and firing at temperatures between 1400° C. and 1600° C., in which no more than half of the granular aggregate is sintered with the surrounding basic base material.

13. The refractory ceramic brick according to claim 12 having at least one of the following property values:
   a) modulus of elasticity: <60 GPa
   b) work of fracture: >200 Nm
   c) nominal notched-bar tensile strength: <9 MPa
   d) characteristic length: >250 mm
   e) invariant point: >1700° C.

14. A refractory ceramic batch with the composition
a) 75 to 98% by wt. of at least one basic base material from the group: sintered magnesia, fused magnesia,
b) 2 to 25% by wt. of at least one granular aggregate from the group: silicon carbide, silicon nitride, silicon oxycarbide, silicon oxycarbonitride,
c) maximum 5% by wt. of other constituents,
relative to the total batch in each case,
d) wherein the granular aggregate whereof is present in a grain fraction >125 μm and <3 mm.

15. The refractory ceramic batch according to claim 14, wherein the basic base material is present in a proportion >10 to <40% by wt. in a fine fraction <125 μm, relative to the total batch.

16. The refractory ceramic batch according to claim 14, the basic base material whereof is present in a proportion of >35% by wt. in a grain fraction >1 mm, relative to the total batch.

17. The refractory ceramic batch according to claim 14, the granular aggregate whereof is present in a grain fraction >0.5 mm and <2 mm.

18. The refractory ceramic batch according to claim 14, the granular aggregate whereof is present in a quantity of 2-10% by wt. relative to the total batch.

19. The refractory ceramic batch according to claim 14, the basic base material whereof comprises at least 95% by wt. MgO.

20. The refractory ceramic batch according to claim 14, in which the $d_{90}$ value of the basic granular base material without the fine fraction lies above the $d_{90}$ value of the granular aggregate.

21. The refractory ceramic batch according to claim 14, the basic base material whereof has an iron content, measured as $Fe_2O_3$, of less than 0.6% by wt. relative to the basic base material.

22. The refractory ceramic batch according to claim 14, which contains less than 0.3% by wt. aluminium oxide relative to the total batch.

23. The refractory ceramic batch according to claim 14, which contains less than 0.3% by wt. chromium oxide relative to the total batch.

24. The refractory ceramic batch according to claim 14, the granular aggregate whereof contains maximum 5% by wt. of other constituents relative to the percentage by weight of the aggregate in the total batch.

25. A refractory ceramic brick produced from a batch according to claim 14 after pressing and firing at temperatures between 1400° C. and 1600° C., in which no more than half of the granular aggregate is sintered with the surrounding basic base material.

26. The refractory ceramic brick according to claim 25 having at least one of the following property values:
a) modulus of elasticity: <60 GPa
b) work of fracture: >200 Nm
c) nominal notched-bar tensile strength: <9 MPa
d) characteristic length: >250 mm
e) invariant point: >1700° C.

27. A refractory ceramic batch with the composition
a) 75 to 98% by wt. of at least one basic base material from the group: sintered magnesia, fused magnesia,
b) 2 to 25% by wt. of at least one granular aggregate from the group: silicon carbide, silicon nitride, silicon oxycarbide, silicon oxycarbonitride,
c) maximum 5% by wt. of other constituents,
relative to the total batch in each case,
d) wherein the basic base material is present in a proportion >10 to <40% by wt. in a fine fraction <125 μm, relative to the total batch,
e) wherein the granular aggregate whereof is present in a grain fraction >125 μm and <2 mm.

28. The refractory ceramic batch according to claim 27, the basic base material whereof is present in a proportion of >35% by wt. in a grain fraction >1 mm, relative to the total batch.

29. The refractory ceramic batch according to claim 27, the granular aggregate whereof is present in a grain fraction >0.5 mm and <2 mm.

30. The refractory ceramic batch according to claim 27, the granular aggregate whereof is present in a quantity of 2-10% by wt. relative to the total batch.

31. The refractory ceramic batch according to claim 27, the basic base material whereof comprises at least 95% by wt. MgO.

32. The refractory ceramic batch according to claim 27, in which the $d_{90}$ value of the basic granular base material without the fine fraction lies above the $d_{90}$ value of the granular aggregate.

33. The refractory ceramic batch according to claim 27, the basic base material whereof has an iron content, measured as $Fe_2O_3$, of less than 0.6% by wt. relative to the basic base material.

34. The refractory ceramic batch according to claim 27, which contains less than 0.3% by wt. aluminium oxide relative to the total batch.

35. The refractory ceramic batch according to claim 27, which contains less than 0.3% by wt. chromium oxide relative to the total batch.

36. The refractory ceramic batch according to claim 27, the granular aggregate whereof contains maximum 5% by wt. of other constituents relative to the percentage by weight of the aggregate in the total batch.

37. A refractory ceramic brick produced from a batch according to claim 27 after pressing and firing at temperatures between 1400° C. and 1600° C., in which no more than half of the granular aggregate is sintered with the surrounding basic base material.

38. The refractory ceramic brick according to claim 37 having at least one of the following property values:
a) modulus of elasticity: <60 GPa
b) work of fracture: >200 Nm
c) nominal notched-bar tensile strength: <9 MPa
d) characteristic length: >250 mm
e) invariant point: >1700° C.

* * * * *